United States Patent [19]

Wier

[11] Patent Number: 4,959,949
[45] Date of Patent: Oct. 2, 1990

[54] FRUIT PICKER

[76] Inventor: Edward J. Wier, 1565 Carew St., Springfield, Mass. 01104

[21] Appl. No.: 436,734

[22] Filed: Nov. 15, 1989

[51] Int. Cl.$^5$ .......................................... A01D 46/24
[52] U.S. Cl. ..................................... 56/328.1; 56/339
[58] Field of Search ...................... 56/328.1, 329, 339

[56] References Cited

U.S. PATENT DOCUMENTS 1,480,825  1/1924  Le Nove ............................... 56/339

FOREIGN PATENT DOCUMENTS 187799  11/1922  United Kingdom ................... 56/339

*Primary Examiner*—Thuy M. Bui
*Attorney, Agent, or Firm*—Jerry T. Kearns

[57] ABSTRACT

A fruit picker includes a rectangular receptacle having four vertical side walls joined by a horizontal floor. The receptacle has an open top and a hollow interior for receiving picked fruit. A vertical one-half inch wide slot is formed in one side wall for receiving the stem of a fruit to be picked. A telescopically extensible handle is secured to the receptacle and includes an internally threaded clamping sleeve surrounding a first tubular member and in threaded engagement with an end portion of a second tubular member. A frusto conical cam surface in the sleeve is in abutment with a resilient ring within the sleeve surrounding the first tubular member for securing the handle in a selected adjusted position. In a second embodiment, a resilient flap members on opposite sides of the slot engage a fruit stem.

6 Claims, 4 Drawing Sheets

FRUIT PICKER

BACKGROUND OF THE INVENTION

1. Field of the Invention

The present invention relates to fruit pickers, and more particularly pertains to a fruit picker for picking stemmed fruits such as apples, citrus fruits, pears, etc. from elevated branches of fruit trees. It is difficult for individuals to pick fruit from elevated branches without the use of step ladders and other devices. Climbing on step ladders can be a hazardous activity, especially for elderly individuals and non-professional fruit pickers engaging in the harvesting of fruit from home grown fruit trees. In order to overcome these problem, the present invention provides a fruit picker which allows fruit to be picked by an individual standing on the ground, without bruising or damaging the picked fruit.

2. Description of the Prior Art

Various types of fruit pickers are known in the prior art. A typical example of such a fruit picker is to be found in U.S. Pat. No. 132,634, which issued to J. Colthar on Oct. 29, 1872. This patent discloses a net-type receptacle having an oval top opening surrounded by a rigid frame and including a fixed blade for severing a fruit stem. U.S. Pat. No. 834,207, which issued to F. Kaufmann on Oct. 23, 1906, discloses a fruit picker having a circular wire frame supporting an open top bag on the end of an elongated handle. U.S. Pat. No. 892,182, which issued to M. Petzer on June 30, 1908, discloses a fruit picker including an open topped woven cylindrical basket disposed on the end of an elongated handle. U.S. Pat. No. 942,302, which issued to E. Ableman on Dec. 7, 1909, discloses a fruit picker including a rectangular wire basket secured to an elongated handle and having an end portion formed by a V-shaped wire frame. U.S. Pat. No. 1,225,097, which issued to V. Young on May 8, 1917, discloses a fruit picker secured on an end of an elongated handle including a stationary stem severing blade.

While the above mentioned devices are directed to fruit pickers, none of these devices disclose a fruit picker having a rectangular receptacle with an open top and a hollow interior provided with a vertically slotted side wall for receiving a fruit stem. Additional features of the present invention, not contemplated by the aforementioned prior art devices include the provision of a telescopic extensible handle including a threaded clamp having a frusto conical cam surface engaging a resilient clamping ring, and a pair of pivotal stem engaging flaps. Inasmuch as the art is relatively crowded with respect to these various types of fruit pickers, it can be appreciated that there is a continuing need for improvements to such fruit pickers, and in this respect, the present invention addresses this need and interest.

SUMMARY OF THE INVENTION

In view of the foregoing disadvantages inherent in the known types of fruit pickers now present in the prior art, the present invention provides an improved fruit picker. As such, the general purpose of the present invention, which will be described subsequently in greater detail, is to provide a new and improved fruit picker which has all the advantages of the prior art fruit pickers and none of the disadvantages.

To attain this, representative embodiments of the concepts of the present invention are illustrated in the drawings and make use of a fruit picker including a rectangular receptacle having four vertical side walls joined by a horizontal floor. The receptacle has an open top and a hollow interior for receiving picked fruit. A vertical one-half inch wide slot is formed in one side wall for receiving the stem of a fruit to be picked. A telescopically extensible handle is secured to the receptacle and includes an internally threaded clamping sleeve surrounding a first tubular member and in threaded engagement with an end portion of a second tubular member. A frusto conical cam surface in the sleeve is in abutment with a resilient ring within the sleeve surrounding the first tubular member for securing the handle in a selected adjusted position. In a second embodiment, a resilient flap members on opposite sides of the slot engage a fruit stem.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fruit picker which has all the advantages of the prior art fruit pickers and none of the disadvantages.

It is another object of the present invention to provide a new and improved fruit picker which may be easily and efficiently manufactured and marketed.

It is a further object of the present invention to provide a new and improved fruit picker which is of a durable and reliable construction.

An even further object of the present invention is to provide a new and improved fruit picker which is susceptible of a low cost of manufacture with regard to both materials and labor, and which accordingly is then susceptible of low prices of sale to the consuming public, thereby making such fruit pickers economically available to the buying public.

Still yet another object of the present invention is to provide a new and improved fruit picker which provides in the apparatuses and methods of the prior art some of the advantages thereof, while simultaneously overcoming some of the disadvantages normally associated therewith.

Still another object of the present invention is to provide a new and improved fruit picker having an elongated handle to enable individuals standing on the ground to pick fruit from elevated branches of fruit trees without tree climbing or utilizing a step ladder.

Yet another object of the present invention is to provide a new and improved fruit picker having a rectangular open top receptacle with a vertically slotted side wall for receiving and severing the stem of a fruit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
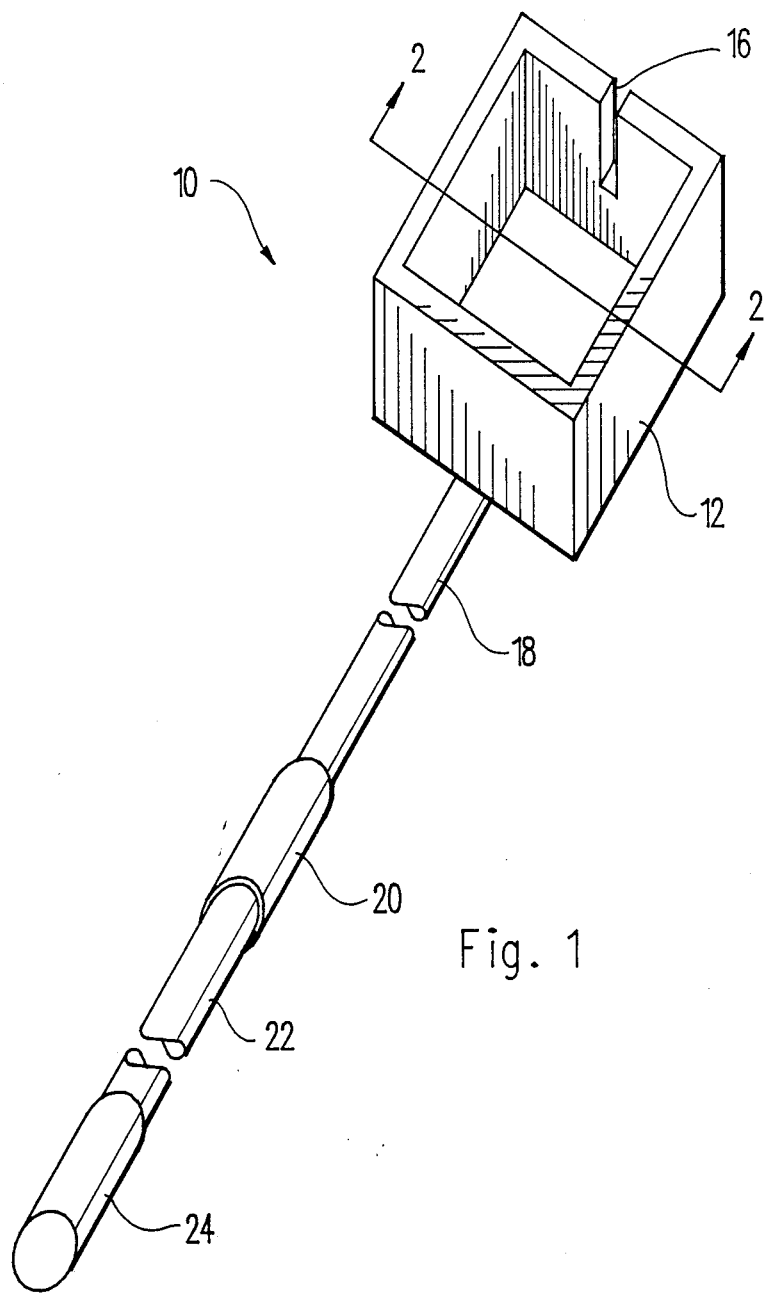
FIG. 1 is a perspective view of the fruit picker according to the first embodiment of the present invention.

With reference now to the drawings, and in particular to FIG. 1 thereof, a new and improved fruit picker embodying the principles and concepts of the present invention and generally designated by the reference numeral 10 will be described.

More specifically, it will be noted that the first embodiment 10 of the invention includes a rectangular receptacle 12 having an open top and a hollow interior formed by four vertical side walls joined by a horizontal floor. The hollow interior portion of the receptacle is preferably dimensioned to receive a single fruit to be picked, for example a grapefruit. A one-half inch wide vertical slot 16 is formed in a vertical side wall of the receptacle 12 for receiving the stem of a fruit being picked. An elongated handle is secured to the receptacle 12 and includes a first smaller diameter tubular member 18 received within a second larger diameter tubular member 22 which includes a hand grip portion 24. A threaded clamping member 20 secures the handle members 18 and 22 in a selected extended position to enable individuals to pick fruits disposed at a variety of different heights in a fruit tree. In use, an individual manipulates the handle to position a fruit within the hollow interior of the receptacle 12, with the fruit stem received through the slot 16. By exerting a pull on the handle, the fruit stem will be severed, while the fruit is retained within the receptacle 12.

Figure 2:
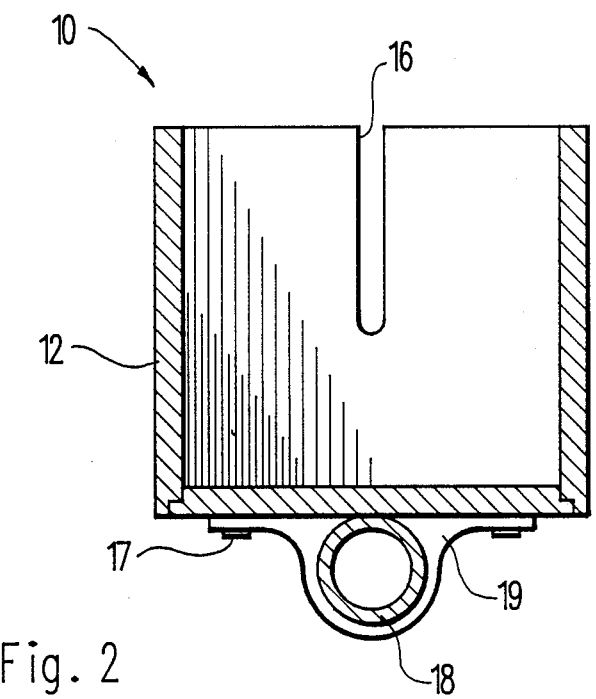
FIG. 2 is a cross sectional view, taken along line 2—2 of FIG. 1.

FIG. 2 is a cross sectional view, taken along line 2—2 of FIG. 1, which illustrates a bracket 19 which secures the handle portion 18 to the exterior surface of the floor of the receptacle 12 by threaded fasteners 17.

Figure 3:
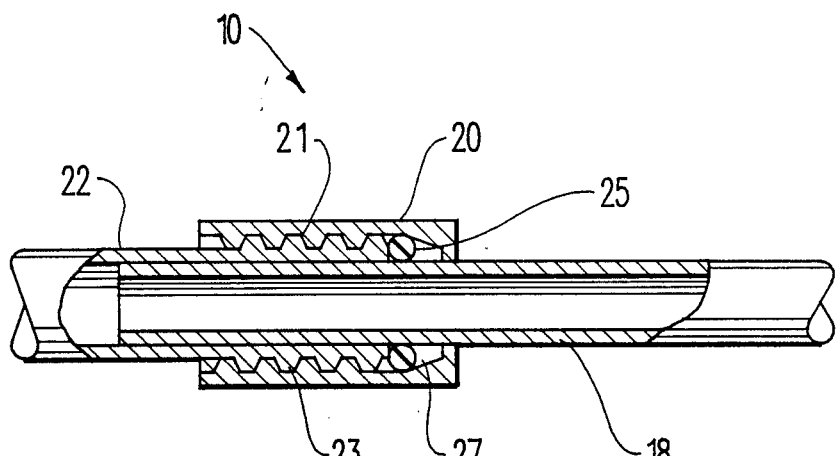
FIG. 3 is a cross sectional detail view illustrating the telescopically adjustable handle clamp member.

FIG. 3 is a cross sectional detail view which illustrates the construction of the adjustable handle clamp 20. An internally threaded sleeve 20 surrounds the first tubular member 18 and is disposed in engagement with external threads 23 formed on an end portion of the second tubular member 22. Engagement of the sleeve threads 21 with the threads 23 allows limited axial movement of the clamping sleeve 20 with respect to the tubular member 22. A frusto conical cam surface 27 is formed adjacent an inner end of the sleeve 20 and a resilient O-ring 25, formed from a rubber material, surrounds the tubular member 18, in abutment with the end face of the member 22 and in contact with the cam surface 27. Upon tightening of the sleeve 20, the sleeve 20 moves to the left as shown in FIG. 3, along the length of the member 22 which forces the ring 25 to be flattened or compressed against the outer surface of the tubular member 18. This provides a frictional clamping engagement which secures the handle tubular members 18 and 22 in a selected extended position.

Figure 4:
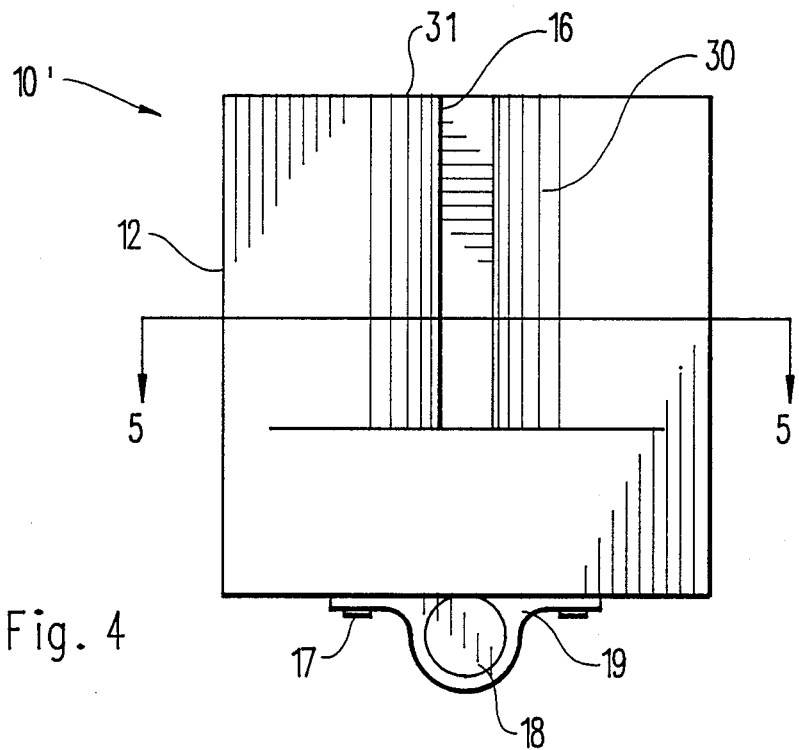
FIG. 4 is a front end view illustrating a fruit picker according to a second embodiment of the present invention.

FIG. 4 illustrates a modified fruit picker 10' according to a second embodiment of the present invention, formed substantially similarly a described with reference to the first embodiment 10 illustrated in FIG. 1, with the following exceptions. The slot 16 formed on a vertical side wall portion of the receptacle 12 is flanked by flap members 30 and 31.

Figure 5:
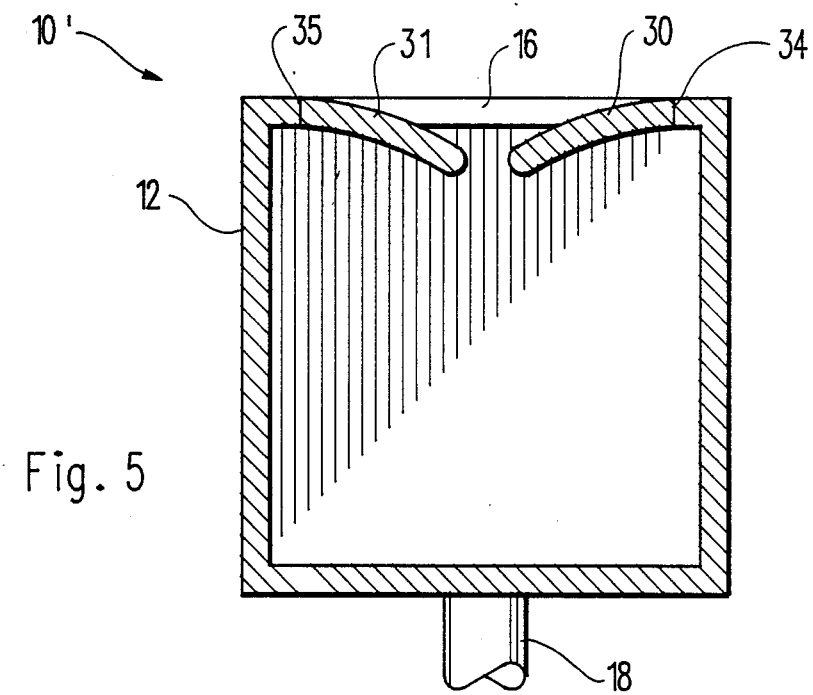
FIG. 5 is a cross sectional view, taken along line 5—5 of FIG. 4.

As shown in the cross sectional view of FIG. 5, the flap members 30 and 31 are mounted for limited arcuate movement, by score fold lines 34 and 35, with respect to the receptacle 12. The flap members 30 and 31 are preferably formed from a material sufficiently resilient to allow limited flexure,.

Figure 6:
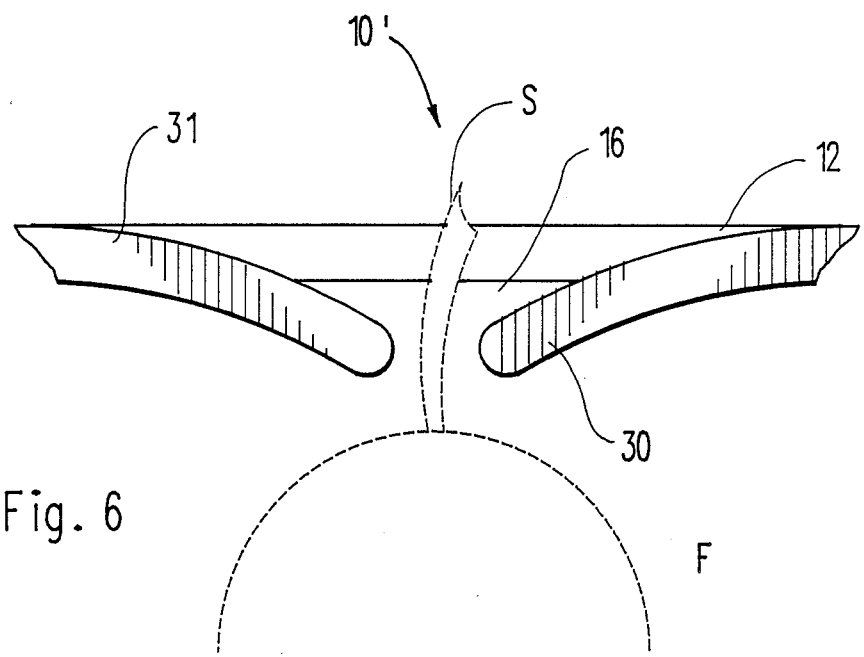
FIG. 6 is a diagrammatic illustration depicting the manner of use of the fruit picker of FIG. 4.

FIG. 6 is a diagrammatic view which illustrates the operation of the fruit picker 10'. A fruit F is initially manipulated into the hollow interior of the receptacle 12. The resilient flaps 30 and 31 are configured to be initially disposed in a slightly inwardly bent orientation as shown. The stem S of the fruit F is received in the vertical slot 16.

Figure 7:
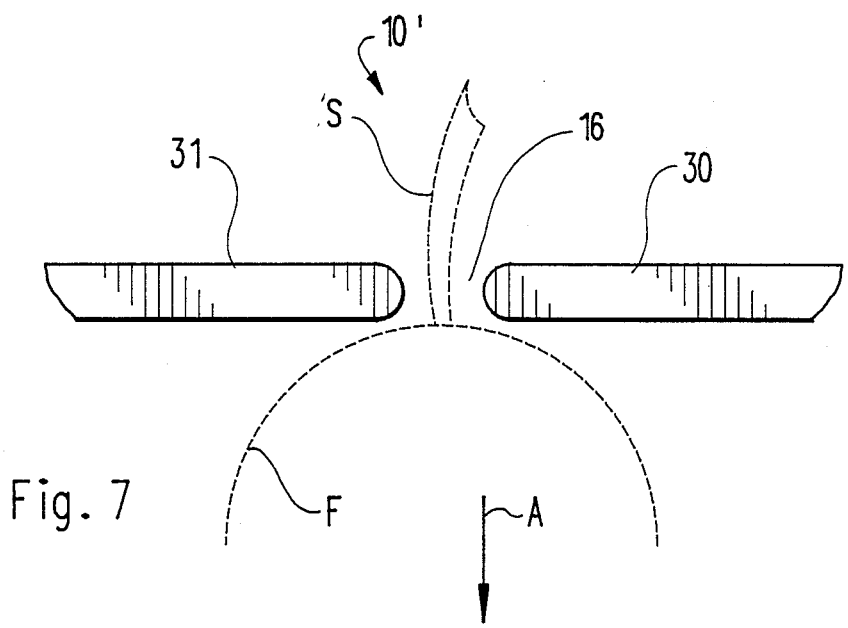
FIG. 7 is a further diagrammatic view illustrating the operation of the fruit picker of FIG. 4.

As shown in FIG. 7, the handle 18 of the fruit picker 10' is then pulled in the direction of arrow A. This causes the fruit F to contact the flaps 30 and 31, breaking or severing the stem. The fruit F is now disposed in the interior portion of the receptacle 12 and may be retrieved by an individual fruit picker.

As may now be understood, the present invention discloses a fruit picker which allows an individual to easily retrieve stemmed fruit from the elevated branches of a fruit tree, without risking injury, or damaging the picked fruit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A fruit picker, comprising:
    a rectangular receptacle having an open top and a hollow interior;
    said receptacle including four vertical side walls joined by horizontal floor;
    a vertical slot formed in a top end one of said side and an elongated handle secured to said receptacle.

2. The fruit picker of claim 1, wherein said handle includes a telescopic extensible portion.

3. The fruit picker of claim 1, wherein said hollow interior of said receptacle is dimensioned to receive a fruit to be picked.

4. The fruit picker of claim 1, wherein said handle includes a first tubular member received for sliding movement within a second tubular member; and
    a threaded clamp for securing said first and second tubular members in adjusted position.

5. The fruit picker of claim 4, wherein said clamp comprises an internally threaded sleeve surrounding said first tubular member and in threaded engagement with an end portion of said second tubular member;
    a frusto conical cam surface in said sleeve; and
    a resilient ring in said sleeve adjacent said cam surface, said ring surrounding said first tubular member and in abutment with an end face of said second tubular member.

6. The fruit picker of claim 1, further comprising a pair of pivotal flaps mounted on opposite sides of said slot.

* * * * *